W. C. BELL.
ANTISKIDDING APPARATUS FOR AUTOCARS, &c.
APPLICATION FILED JAN. 29, 1916.

1,202,354.

Patented Oct. 24, 1916.
2 SHEETS—SHEET 1.

Witnesses:

Inventor:
William C. Bell
by Frank D. Thomason,
Atty.

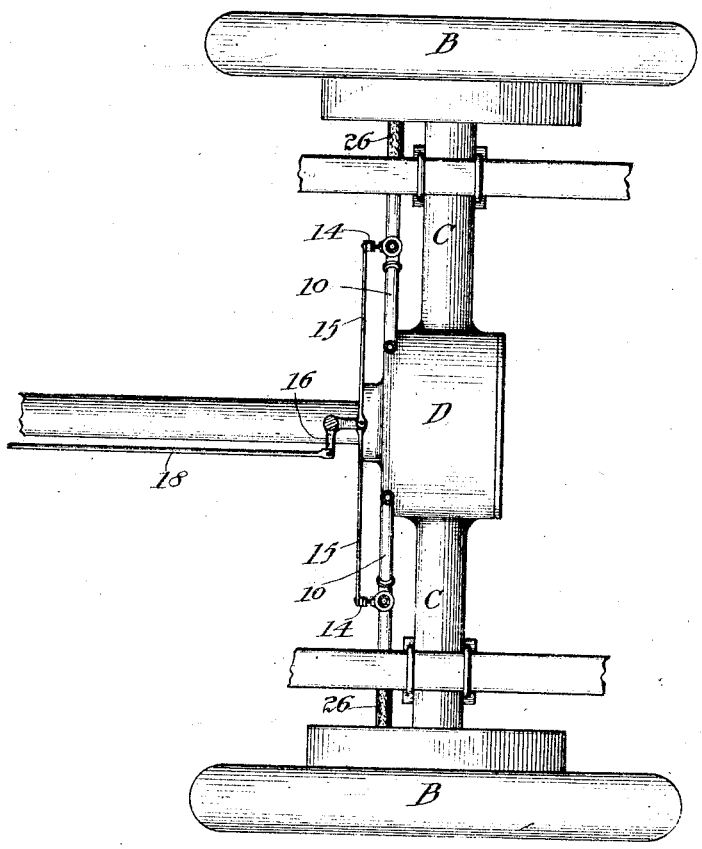

UNITED STATES PATENT OFFICE.

WILLIAM C. BELL, OF WINNETKA, ILLINOIS.

ANTISKIDDING APPARATUS FOR AUTOCARS, &c.

1,202,354.  Specification of Letters Patent.  Patented Oct. 24, 1916.

Application filed January 29, 1916. Serial No. 75,107.

*To all whom it may concern:*

Be it known that I, WILLIAM C. BELL, a citizen of the United States, residing at Winnetka, in the county of Cook and State of Illinois, have invented new and useful Improvements in Antiskidding Apparatus for Autocars, &c., of which the following is a full, clear, and exact description.

My invention relates to means for preventing the skidding of motor propelled vehicles, and particularly autocars, auto-trucks, motorcycles, and the like.

Heretofore the treads of tires have been made of many and varied designs, and anti-skidding chains of one design or another have been secured on the same to prevent skidding, but these expedients do not prevent skidding on a smooth, wet or icy hard roadway, and the public to a great extent have been reverting to a tire having a comparatively smooth tread and are discarding chains as they tear and wear the tire to a costly extent.

The object of my invention is to enable the tread of the tires of the wheels of the car to obtain a secure purchase on a hard pavement when it is slippery, particularly when it is desired to turn the car from a straight course and to accomplish this result by means that distribute sand on the pavement in front of the wheels—particularly the rear wheels, and by means that are under control of the chauffeur or driver, substantially as hereinafter fully described, and as particularly pointed out in the claims.

Figure 1:
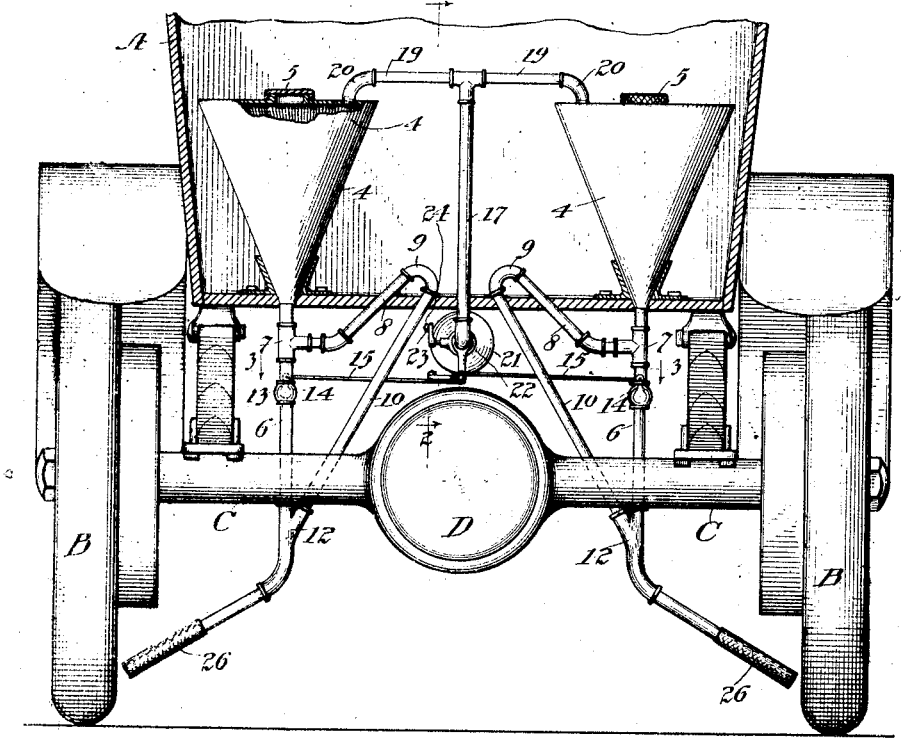
Figure 2:
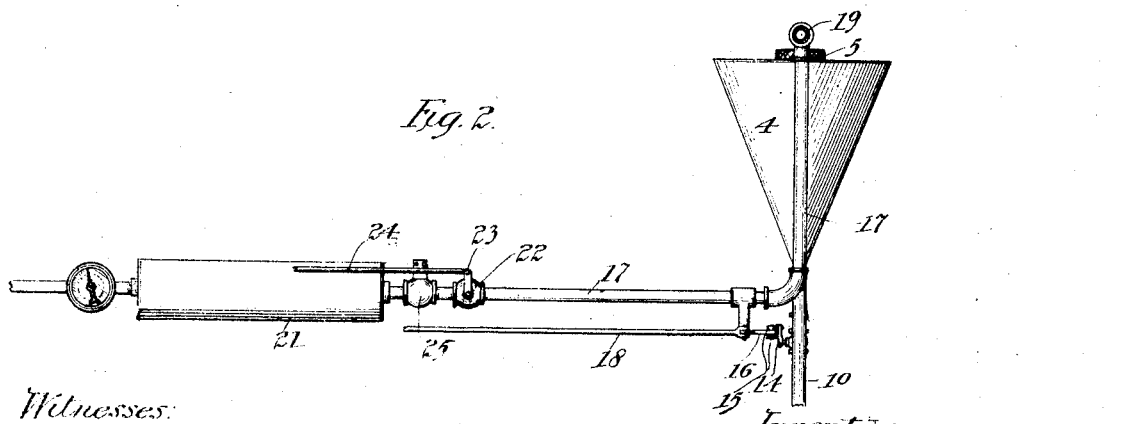

In the drawings:—Figure 1 is a rear view of an auto-car showing my improvements applied thereto, and showing the rear end of the body of the car in section so as to disclose the sand boxes and their connections. Fig. 2 is a vertical section taken on dotted line 2—2, Fig. 1, with the body and other parts of the car eliminated. Fig. 3 is a horizontal section of the rear end of the car taken on dotted line 3—3, Fig. 1.

Having reference to the drawings, A represents the body of an auto-car; B, B, the rear wheels thereof; C the casing for the rear axle, and D the transverse gear box.

As shown in the drawings, my invention comprises a pair of funnel-shaped sand boxes 4, 4, which, however, may be of any other suitable design, and are supported by base-plates resting on the floor of the body, as shown, and are located, preferably, under the rear seats next each side of the car. The top of these boxes are provided with suitable openings that are closed by covers 5, and the bottoms thereof extend down through the floor of the car and discharge into the discharge pipes 6. Pipes 6 extend downward to a point below the axles, and are then bent laterally at a suitable angle and incline downward to a point in front of the base of the rear wheels or into such position that the sand discharged therefrom will fall immediately in front of the path of the rear wheels. A short distance below the bottom of the box the discharge-pipes 6 are provided with a T-coupling 7, the laterally extending branch of which has a pipe 8 extending inward and upward therefrom to a point above the plane of the discharge opening of the sand box through the floor of the car, if necessary, and this pipe 8 is connected by means of an elbow 9 to a downwardly and outwardly inclined pipe 10, which at its lower end is connected to pipe 6 by a Y-coupling 12. Immediately below T-coupling 7 pipes 6 are provided with a cut-off valve 13 of any suitable construction the spindle of which extends out of its casing and has an arm 14 mounted on its outer end which is connected by a transverse link 15 to the rearwardly extending arm of a bell-crank 16. This bell-crank is fulcrumed under the center of the car to a bracket secured to and depending from an exhaust-pipe 17 of the compressed air system of the car (hereinafter fully explained), or to any other suitable support connected with the body thereof, and the laterally extending arm of this bell-crank is connected by means of a longitudinally disposed connecting-rod 18 to a lever or pedal (not shown) within convenient reach of the driver.

When it is desired to discharge the sand from the hoppers by gravity, connecting-rod 18 is manipulated so that valves 13 will open, whereupon the sand will gravitate straight down from the hoppers through the lower inclined end of pipes 6 and out through the flexible tubular extensions 26 secured on the lower ends of the same. These flexible extensions are desirable because of the possibility of the lower ends of the discharge-pipes being struck by obstacles on the road and injured unless flexible. In order to insure the discharge of the sand promptly means, in addition to gravity must be used to force the same out at the instant it is needed. To do this, my invention contemplates closing valves 13 in the discharge pipes 6 and forcing the sand, by means of compressed air out through the detour of pipes comprising pipes 8, elbow 9 and pipe 10. This compressed air is introduced into the upper ends of the hoppers by transverse pipes 19 which are connected to the upper end of pipe 17 by means of a T-coupling and are connected with the interior of the upper ends of the hoppers by suitable elbows 20. Pipe 17 extends vertically downward to a suitable point below the body of the car and then, by means of a suitable elbow, is extended longitudinally forward to and into a compressed air tank 21. A short distance to the rear of this compressed air tank, pipe 17 has a valve 22 therein, the spindle of which extends laterally out through suitable bearings in its casing, and has an arm 23 securely mounted thereon. This arm extends upward and has the rear end of a connecting rod 24 pivotally connected thereto, and this rod 24 extends to the front part of the car and is there connected to a lever or pedal (not shown) within easy reach of the driver of the car. Between valve 22 and tank 21 a suitable safety-valve 25 is connected with pipe 17 so that should an excess of pressure be introduced into tank 21 the air will escape without injury to sand-boxes 4.

What I claim as new is:—

1. The combination with an auto-car or the like, of a sand-box supported thereby, a discharge-pipe leading downward therefrom, valve controlled means for introducing air-pressure into said sand-box, a valve in said discharge-pipe, devices extending into the body of said car for operating said valve, a system of pipes the ends of which are connected to said discharge-pipe and which make a detour around said valve, and means extending into the body of the car for operating said valve.

2. The combination with an auto-car or the like, of a sand-box supported thereby, a discharge-pipe leading downward therefrom, valve controlled means for introducing air-pressure into said sand-box, a valve in said discharge-pipe, devices extending into the body of said car for operating said valve, a system of pipes the ends of which are connected to said discharge-pipe and which make a detour around said valve the return bend of which is above the plane of the discharge opening of the sand-box, and means extending into the body of the car for operating said valves.

3. The combination with an autocar or the like, of a sand-box supported thereby, a discharge-pipe leading downward therefrom, a flexible tubular extension secured on the lower end of said discharge-pipe having its lower end terminate in such position that it will discharge on the road in front of a wheel of said car, valve controlled means for introducing air-pressure into said sand-box, a valve in said discharge-pipe, devices extending into the body of said car for operating said valve, a system of pipes the ends of which are connected to said discharge-pipe and which make a detour around said valve, and means extending into the body of the car for operating said valves.

4. The combination with an auto-car or the like, of a sand-box supported thereby, a discharge-pipe leading downward therefrom, valve controlled means for introducing air-pressure into said sand-box, a valve in said discharge-pipe, devices extending into the body of said car for operating said valve, a system of pipes the ends of which are connected to said discharge-pipe and which make a detour around said valve, and means including an arm on the outer extended end of the spindle of said valve, a transverse link connecting said arm to a bell-crank; said bell-crank and a longitudinally extending rod pivotally connected thereto for operating said valve.

5. The combination with an auto-car or the like, of a sand-box supported thereby, a discharge-pipe, a compressed air pipe discharging into said sand-box, a compressed air tank from which said last mentioned pipe leads, a valve in said compressed air pipe, a connecting rod pivoted to and extending from the spindle of the compressed air-pipe, an arm on the outer extended end of the spindle of the discharge-pipe valve, a transverse link connecting said arm to a bell-crank; said bell-crank and a longitudinally extending rod pivotally connected thereto for operating said discharge-pipe valve.

6. The combination with an auto-car or the like, of a sand-box supported thereby, a discharge-pipe leading downward therefrom, a valve in said discharge-pipe, a system of pipes the ends of which are connected to said discharge-pipe and which make a detour around said valve, a compressed air pipe discharging into said sand-box, a compressed air tank from which said last mentioned pipe leads, a valve in said compressed air pipe, a connecting rod pivoted to and extending from the spindle of said last mentioned valve, and means extending into the body of the car for operating the valve in the discharge-pipe.

In witness whereof I have hereunto set my hand this 26th day of January, 1916.

WILLIAM C. BELL.

Witnesses:
FRANK D. THOMASON,
FLORENCE MITCHELL.